United States Patent
Huang et al.

(10) Patent No.: US 9,612,730 B2
(45) Date of Patent: Apr. 4, 2017

(54) VIEWING DIFFERENT WINDOW CONTENT WITH DIFFERENT ATTENDEES IN DESKTOP SHARING

(71) Applicant: Cisco Technology, Inc., San Jose, CA (US)

(72) Inventors: Haihua Huang, Jiangsu (CN); Ling Chen, Jiangsu (CN); Jun Xiao, Jiangsu (CN)

(73) Assignee: Cisco Technology, Inc., San Jose, CA (US)

(*) Notice: Subject to any disclaimer, the term of this patent is extended or adjusted under 35 U.S.C. 154(b) by 501 days.

(21) Appl. No.: 14/153,670

(22) Filed: Jan. 13, 2014

(65) Prior Publication Data
US 2015/0200979 A1    Jul. 16, 2015

(51) Int. Cl.
| | |
|---|---|
| *G06F 3/00* | (2006.01) |
| *G06F 3/048* | (2013.01) |
| *G06F 3/0484* | (2013.01) |
| *G06F 3/0483* | (2013.01) |
| *G06F 3/0482* | (2013.01) |
| *H04L 29/06* | (2006.01) |

(52) U.S. Cl.
CPC ........ *G06F 3/04842* (2013.01); *G06F 3/0482* (2013.01); *G06F 3/0483* (2013.01); *H04L 65/4015* (2013.01); *H04L 67/38* (2013.01)

(58) Field of Classification Search
None
See application file for complete search history.

(56) References Cited

U.S. PATENT DOCUMENTS

| | | | | | |
|---|---|---|---|---|---|
| 5,889,945 | A * | 3/1999 | Porter | ........... | G06F 3/0481 709/204 |
| 6,329,984 | B1 * | 12/2001 | Boss | ........... | G06F 3/0481 715/204 |
| 6,570,590 | B1 * | 5/2003 | Dubrow | ........... | G06F 3/038 715/748 |
| 7,634,540 | B2 * | 12/2009 | Ivashin | ........... | G06Q 10/10 348/14.01 |

(Continued)

OTHER PUBLICATIONS

Remote Viewer Navigation of a Live Online Presentation, Nov. 1, 2006, 3 pages.*

(Continued)

*Primary Examiner* — Yongjia Pan
(74) *Attorney, Agent, or Firm* — Edell, Shapiro & Finnan, LLC

(57) ABSTRACT

A presenter device transmits, to an attendee device participating in an online desktop sharing session, image data of a plurality of windows. The plurality of windows comprises a foreground window obscuring at least a portion of at least one background window. The presenter device captures image data of at least one background window including the obscured portion of the background window without altering the display of the presenter device. A request is received from the attendee device for image data of at least one background window to display the background window over the foreground window on a display of the attendee device. In response to receiving the request, the presenter device transmits the captured image data of the background window, including any obscured portion, to the attendee device.

25 Claims, 15 Drawing Sheets

ATTENDEE BRINGS 2.txt TO THE TOP WITHOUT CHANGING ANY WINDOW POSITION

(56) References Cited

U.S. PATENT DOCUMENTS

| | | | | |
|---|---|---|---|---|
| 7,904,820 B2* | 3/2011 | Anglin | | G06F 3/038 |
| | | | | 709/204 |
| 8,185,828 B2* | 5/2012 | Liu | | G06Q 10/10 |
| | | | | 715/753 |
| 8,671,360 B2* | 3/2014 | Olsen | | G06F 3/1423 |
| | | | | 709/205 |
| 8,782,534 B2* | 7/2014 | Bryant | | G06Q 10/10 |
| | | | | 715/751 |
| 2001/0023430 A1* | 9/2001 | Srinivasan | | H04L 12/1813 |
| | | | | 709/204 |
| 2003/0208534 A1* | 11/2003 | Carmichael | | H04L 12/1813 |
| | | | | 709/203 |
| 2003/0220973 A1 | 11/2003 | Zhu et al. | | |
| 2004/0103151 A1* | 5/2004 | Ettinger | | H04L 29/06 |
| | | | | 709/205 |
| 2004/0179036 A1* | 9/2004 | Teplov | | G06F 3/1454 |
| | | | | 715/751 |
| 2006/0136828 A1* | 6/2006 | Asano | | G06F 3/1454 |
| | | | | 715/733 |
| 2006/0161624 A1* | 7/2006 | Montgomery | | H04L 29/06 |
| | | | | 709/204 |
| 2006/0195520 A1* | 8/2006 | Stevens | | H04L 12/1827 |
| | | | | 709/204 |
| 2006/0253797 A1* | 11/2006 | Madan | | G06F 3/0483 |
| | | | | 715/792 |
| 2007/0294626 A1* | 12/2007 | Fletcher | | H04L 67/38 |
| | | | | 715/751 |
| 2008/0091778 A1* | 4/2008 | Ivashin | | G06Q 10/10 |
| | | | | 709/204 |
| 2008/0320399 A1* | 12/2008 | Anglin | | G06F 3/038 |
| | | | | 715/759 |
| 2009/0292999 A1* | 11/2009 | LaBine | | H04L 12/1827 |
| | | | | 715/740 |
| 2010/0037151 A1* | 2/2010 | Ackerman | | G06Q 10/10 |
| | | | | 715/753 |
| 2010/0131868 A1* | 5/2010 | Chawla | | G06F 3/044 |
| | | | | 715/759 |
| 2010/0293469 A1* | 11/2010 | Khot | | H04N 7/147 |
| | | | | 715/730 |
| 2012/0005588 A1* | 1/2012 | Bastide | | G06Q 10/10 |
| | | | | 715/741 |
| 2012/0089928 A1* | 4/2012 | Bryant | | G06Q 10/10 |
| | | | | 715/753 |
| 2013/0110937 A1* | 5/2013 | Burns | | G06Q 10/103 |
| | | | | 709/205 |
| 2013/0290863 A1* | 10/2013 | Chen | | G06Q 10/10 |
| | | | | 715/747 |
| 2014/0019858 A1* | 1/2014 | McAllister | | G09G 5/026 |
| | | | | 715/273 |
| 2014/0129945 A1* | 5/2014 | Bhogal | | G06F 3/01 |
| | | | | 715/732 |
| 2014/0208211 A1* | 7/2014 | Luo | | G06Q 10/10 |
| | | | | 715/730 |
| 2015/0026595 A1* | 1/2015 | Lu | | H04L 65/403 |
| | | | | 715/753 |
| 2015/0058748 A1* | 2/2015 | Huang | | H04L 65/403 |
| | | | | 715/753 |

OTHER PUBLICATIONS

Methods and apparatus for customized view of a shared screen, published Jul. 30, 2013, 7 pages.*

Behera, et al., "Looking at projected documents: Event detection & document identification," IEEE International Conference on Multimedia and Expo (ICME), Jun. 2004, pp. 1-4.

PrecisionIR Group, "IR Webcast Options," PrecisionIR.com, 2010, pp. 1-3.

Macromedia, Breeze Meeting User Guide for Meeting Hosts and Presenters, retrieved from http://downloadmacromedia.com/pub/documentation/en/breeze/5/meeting_ug_presenters.pdf, on Aug. 20, 2013, 130 pages.

* cited by examiner

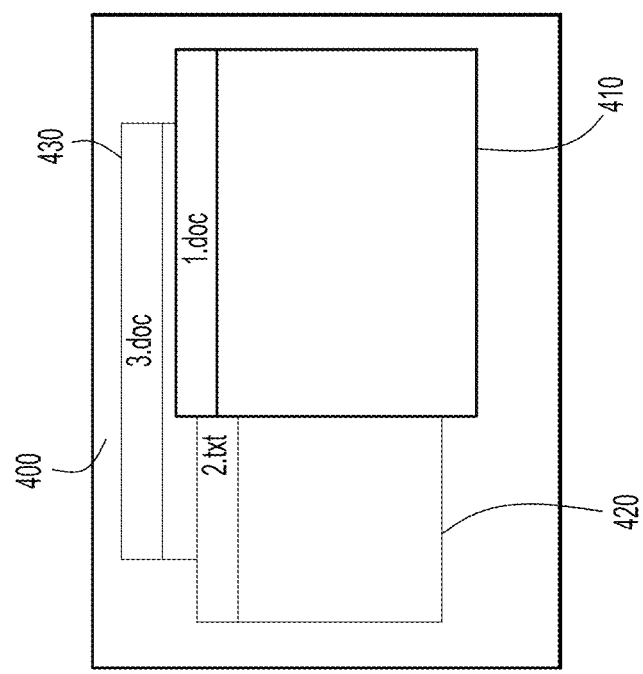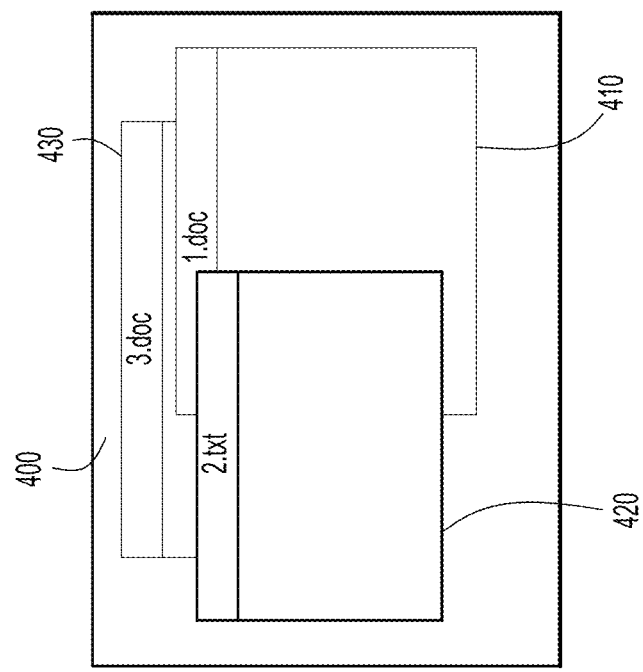
FIG.5A

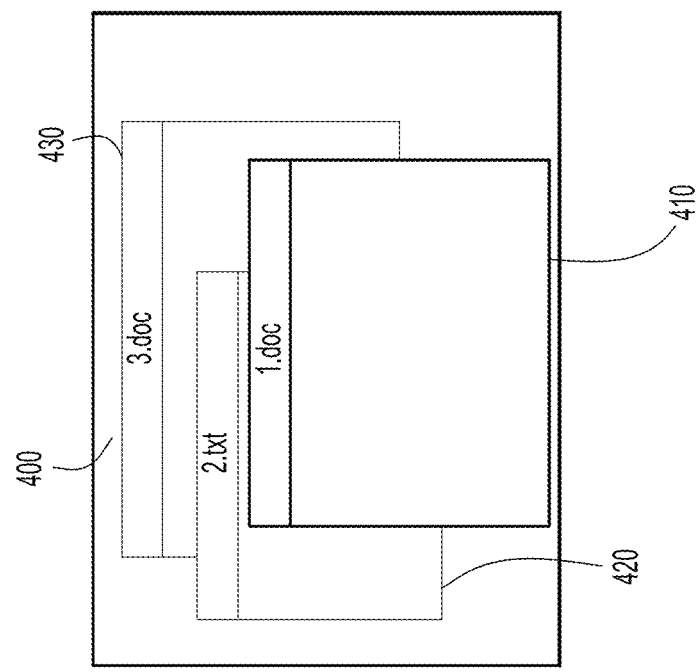
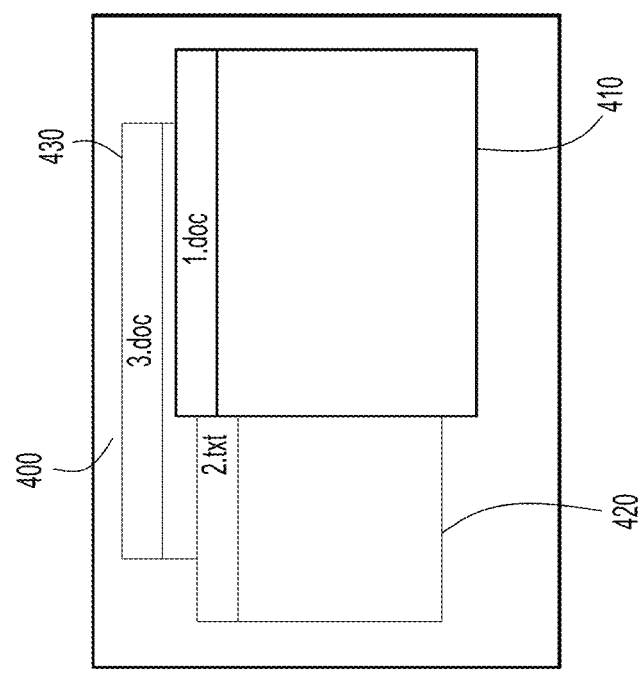
FIG.5B

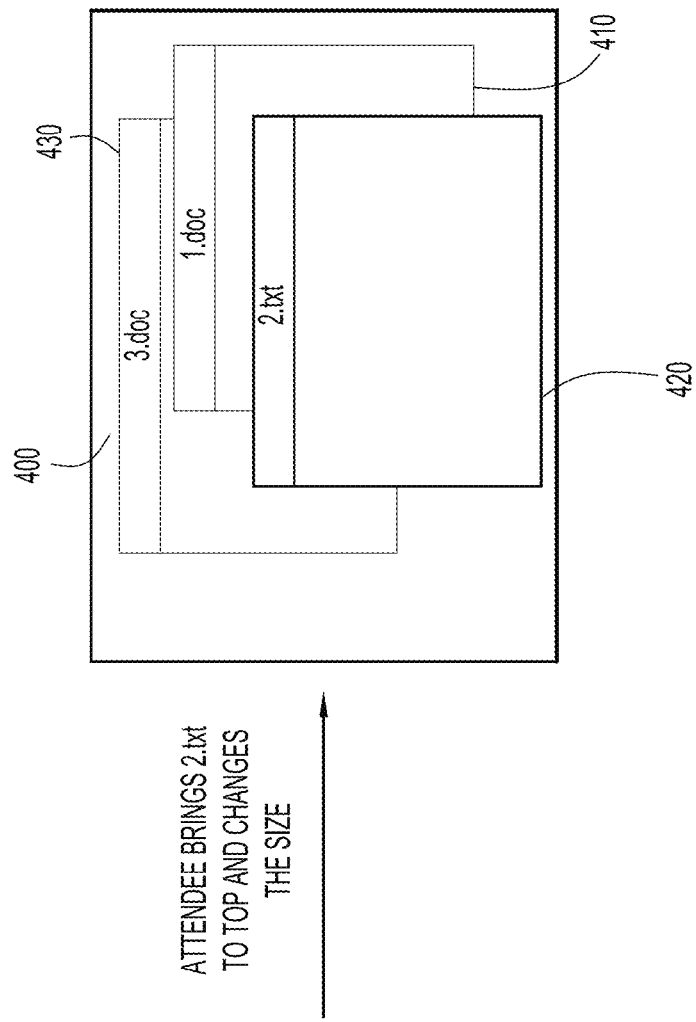
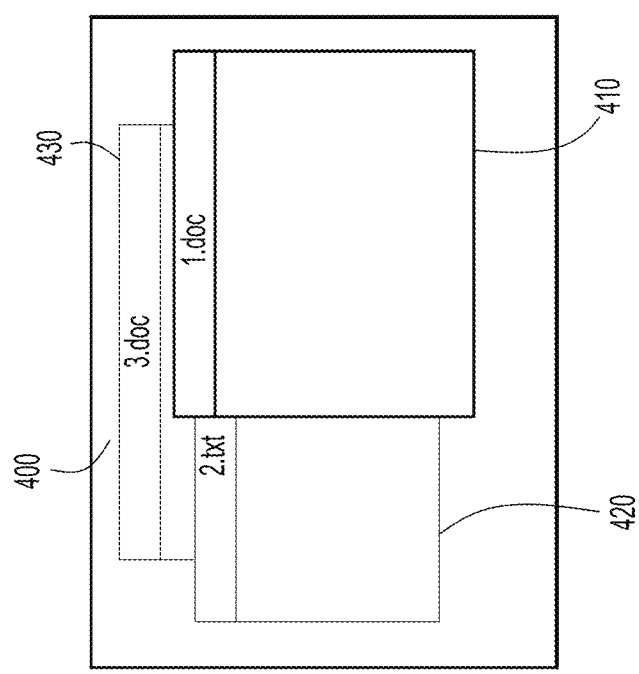
FIG. 5C

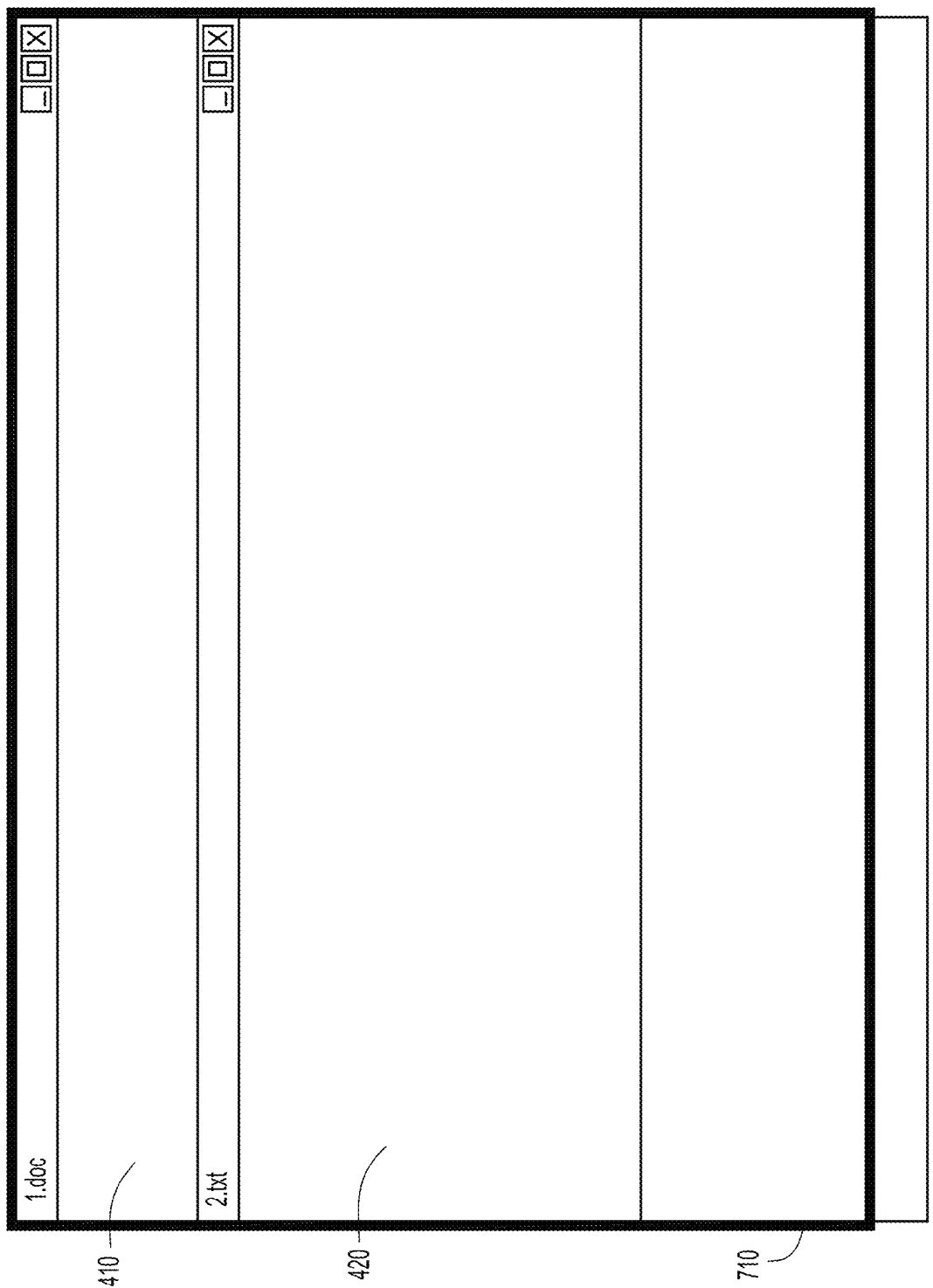

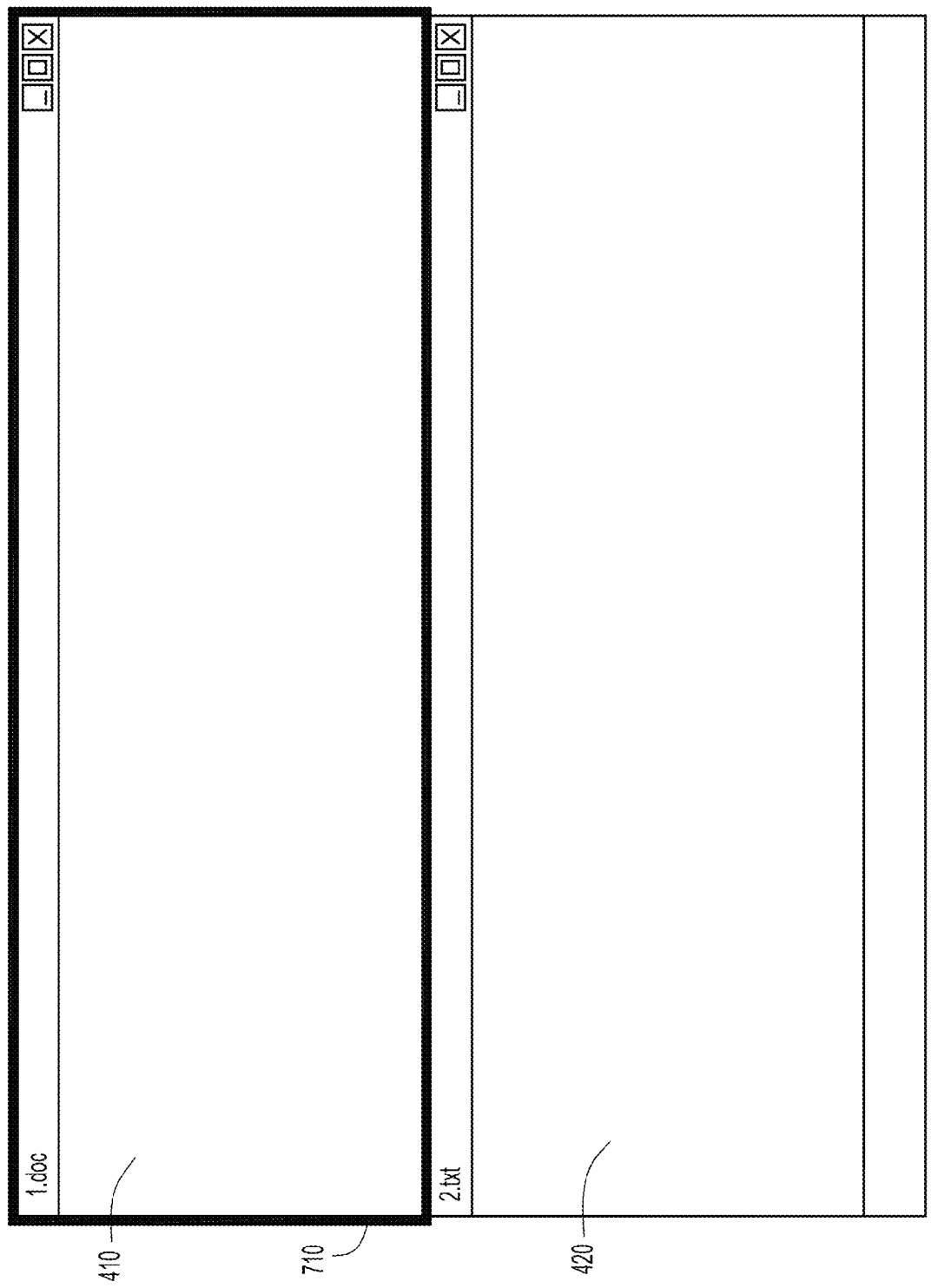

VIEWING DIFFERENT WINDOW CONTENT WITH DIFFERENT ATTENDEES IN DESKTOP SHARING

TECHNICAL FIELD

The present disclosure relates to the display of window content in an online desktop sharing session.

BACKGROUND

In online/web-based meetings involving desktop sharing, windows displayed on a presenter's device can be shared with a plurality of meeting attendees by simultaneously displaying the image of the windows on the attendees' devices. The desktop on the presenter's device is captured as a series of images, including all of the visible windows. Typically the image data form the presenter's desktop is transmitted to a meeting server, which then distributes the image data to all of the attendee devices. As multiple windows may overlap and obscure each other, some portions of the background windows may not be visible unless the presenter brings that window to the foreground.

BRIEF DESCRIPTION OF THE DRAWINGS

FIG. 5A shows an example of simulated screenshots from the display of the attendee device before and after the attendee has brought one of the background windows to the foreground.

FIG. 5B shows an example of simulated screenshots from the display of the attendee device before and after the attendee has changed the position of the foreground window.

FIG. 5C shows an example of simulated screenshots from the display of the attendee device before and after the attendee has changed the position, the size, and the z-order of the windows in the desktop sharing session.

FIG. 7A shows a simulated screenshot from the display of the attendee device with a border around the window that is in the foreground of the presenter's display.

FIG. 7B shows a simulated screenshot from the display of the attendee device with a border around the presenter's foreground window with the windows rearranged such that none of the presenter's foreground window is obscured.

DESCRIPTION OF EXAMPLE EMBODIMENTS

Overview

A presenter device transmits, to an attendee device participating in an online desktop sharing session, image data of a plurality of windows. The plurality of windows comprises a foreground window obscuring at least a portion of at least one background window. The presenter device captures image data of at least one background window including the obscured portion of the background window without altering the display of the presenter device. A request is received from the attendee device for image data of at least one background window to display the background window over the foreground window on a display of the attendee device. In response to receiving the indication, the presenter device transmits the captured image data of the background window, including any obscured portion, to the attendee device.

Example Embodiments

Figure 1:
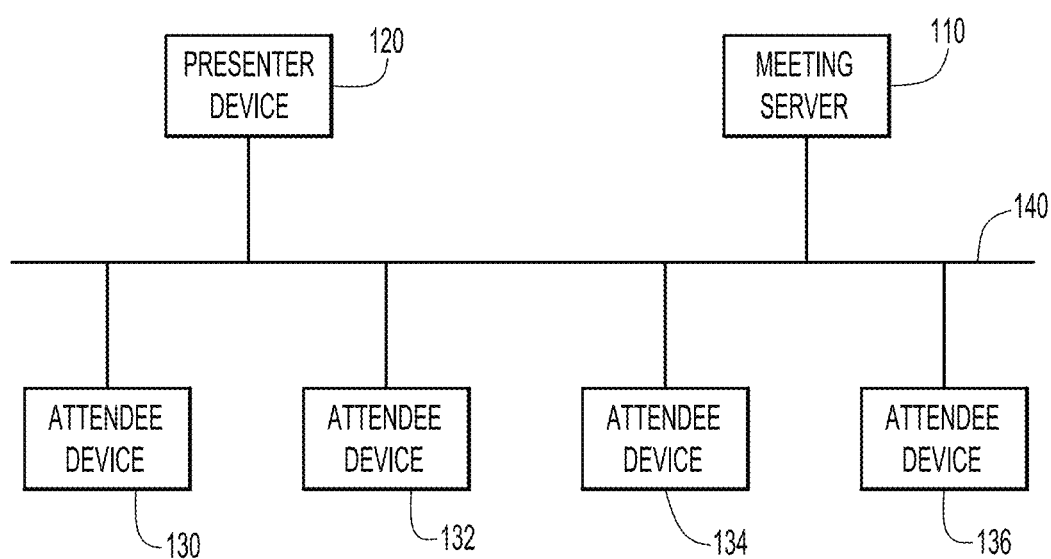
FIG. 1 is a block diagram of a system of computers configured to participate in an online desktop sharing session according to the techniques presented herein.

Referring to FIG. 1, an online conference system 100 is shown that enables a meeting server 110 to facilitate a desktop sharing session in which presenter device 120 shares a computer desktop with attendee devices 130, 132, 134, and 136 over network 140. Only four attendee devices are shown in FIG. 1, but any number of attendee devices may be included in system 100. Presenter device 120 and attendee devices 130-136 may take a variety of forms, including a desktop computer, laptop computer, mobile/cellular phone, tablet computer, etc. Network 140 may be any type of network (e.g., any combination of Internet, intranet, local area network (LAN), wide area network (WAN), wired network, wireless network, etc.) that connects computing devices, e.g., presenter device 120 and attendee devices 130-136. Meeting server 110 may be used, for example, to mediate transactions between presenter device 120 and attendee devices 130-136. Server 110 may also perform caching or other time/bandwidth saving techniques. It should be understood that in a web-based conference system, each device may communicate with the server 110 through a browser application having one or more plug-ins that enable web-based meeting, and allow for the transmission of data to the meeting server 110, and the reception of data from the meeting server during a conference/meeting session.

Figure 2:
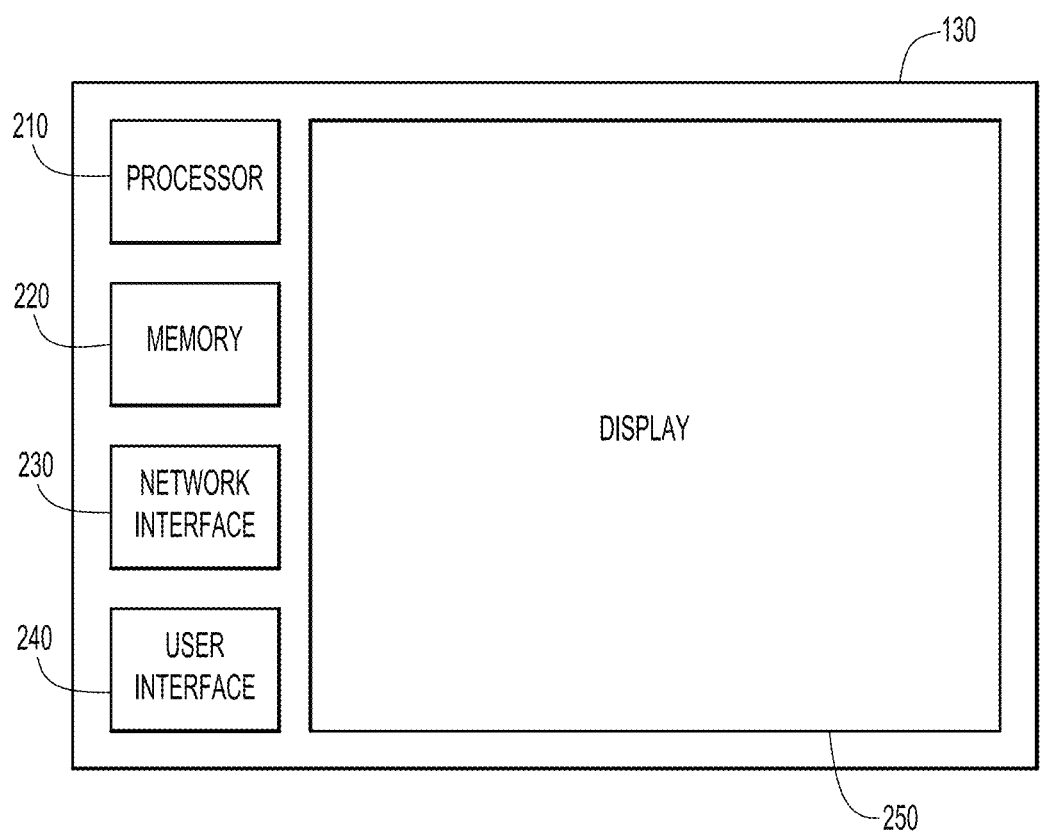
FIG. 2 is a block diagram of a user device that may be configured to act as a presenter device or an attendee device in the online desktop sharing session

Referring to FIG. 2, a simplified block diagram of an example device, e.g., presenter device or attendee device is shown. For simplicity, FIG. 2 shows a block diagram of one of the attendee devices, generically referred or labeled with reference numeral 130. The device includes a processor 210 to process instructions relevant to a conference/meeting session supported by the system 100, memory 220 to store a variety of data and software instructions (e.g., display data for shared documents, applications, as well software instructions for a browser application to enable the connectivity and display of data during a conference session, etc.). The device also includes a network interface unit (e.g., card) 230 to communicate with other devices over network 140, and a user interface unit 240 to receive input from a user, and a display 250. The display 250 may be used to display the user interface (e.g., a desktop with windows) and other data associated with functions of the device as well as user interface elements associated with the conference session (by way of software for a browser application stored in memory 220). The user interface unit 240 may be in the form of a keyboard, mouse and/or a touchscreen user interface (integrated with display 240) to allow for a user of the attendee device to interface with the device. Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein. While attendee device 130 and host device 120 will be described as different devices, they differ only in their respective roles in the conference session. In general, a user device that can be configured to be an attendee device 130 may also be configured to be a host device 120, at different times in the same or different conference sessions.

Typically in desktop sharing sessions, attendees are constrained to viewing the windows on the shared desktop in the same z-order as the presenter. As used herein, the term z-order refers to the order of windows in a desktop, and determines which window will be visible when the position of two or more windows overlaps. Occasionally, an attendee may want to bring a different window to the front of the display, and view the desktop windows in a different z-order than the presenter. For example, an attendee who is helping troubleshoot an issue on the presenter device may want to view a log file in one window, while the presenter is talking about the issue in a different window.

In order to enable the functionality described herein, presenter device 120 captures image data of the presenter device's desktop and transmits the image data to the attendee devices 130-136. The image data is reproduced at the attendee devices, allowing the attendees to view the same desktop displayed on the presenter device 120. The meeting server 110 may function as an intermediary to this transmission of image data. In order to allow obscured windows to be displayed on attendee devices, the presenter device captures image data of the background windows. While the description focuses on windows in a desktop sharing session, the techniques presented herein may be directed toward other visual aspects of the presenter's desktop, such as browser tabs within a window. To capture the image data of the background windows, an operating system Application Programming Interface (API) may be used, such as WM_PRINT or WM_PRINTCLIENT in the Microsoft Windows® operating system.

In one example, the presenter device 120 may capture image data from all of the windows, and continuously transmit updated window images to the meeting server 110 and/or the attendee devices 130-136. In another example, the image data of the background windows may be captured continuously, but only transmitted in response to a request by one or more attendee devices. In yet another example, the image data for the windows may be captured only in response to a request from one or more attendee device for the image data of that window. The transmission of image data from background windows may begin automatically or be triggered by actions of the presenter or attendees. Additionally, the image data may be cached on one or more of the presenter device 120, the meeting server 110, or the attendee devices 130-136.

The image data from the background window may be further processed, e.g., to add user interface elements or to combine the image of the background window with image data from the rest of the desktop. As part of the processing, the position and size of each of the windows may be tracked. In one example, the image data of the background windows is processed at the meeting server 110 and/or at the presenter device 120. The image data of background windows may additionally be cached at the meeting server and/or the presenter device. The image data of all of the background windows may be captured at the beginning of the desktop sharing session and updated continually. Alternatively, the image data of the background windows may not be captured until an attendee device performs an action that requires additional image data from the background windows. Three examples of attendee actions that trigger the need for additional image data are described below with respect to FIGS. 5A-5C.

Figure 3A:
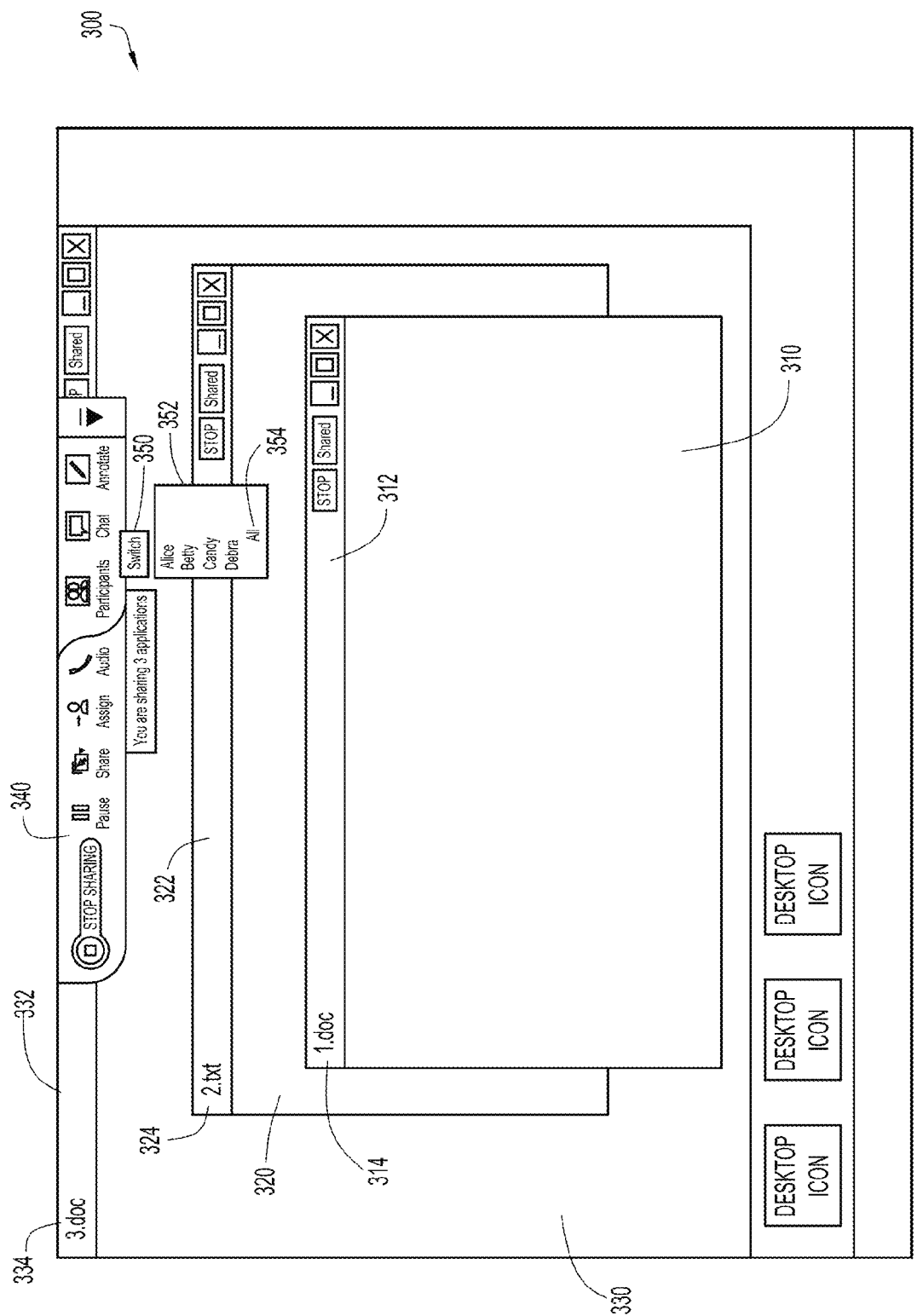
FIG. 3A is a simulated screenshot from the display of the presenter device in the desktop sharing session, including a user interface element configured to force attendee devices to match the z-order of the presenter device.

Referring now to FIG. 3A, a screenshot from the display of a presenter device sharing a desktop with a plurality of windows in shown. The desktop 300 displayed on the presenter device includes a foreground window 310, with a title bar 312 and window name 314. In this example, desktop 300 also includes background window 320, with title bar 322 and window name 324, and background window 330, with title bar 332 and window name 334. In other examples, more or fewer background windows may be shared in the sharing session. While desktop 300 is being shared, a user interface element 340 is displayed on the presenter device to enable the presenter to control various aspects of the sharing session.

In one example, user interface element 340 includes a button 350 that controls the window z-order (i.e., which window is displayed in front of other windows) on the attendee devices in the desktop sharing session. As will be explained below in more detail, an attendee device may be configured to display a window z-order different from the window z-order on the presenter device. In this example, button 350 opens to display a list of names 352 of attendee devices (e.g., Alice, Betty, Candy, and Debra) that are displaying the windows in a different z-order than the presenter. In accordance with the techniques presented herein, by clicking on a particular attendee device name, the presenter can force that attendee device to restore the z-order of the windows to match the z-order of the presenter device. Additionally, the list of names may include an entry 354 that will force all of the attendee devices to match the z-order of the windows displayed on the presenter device.

Figure 3B:
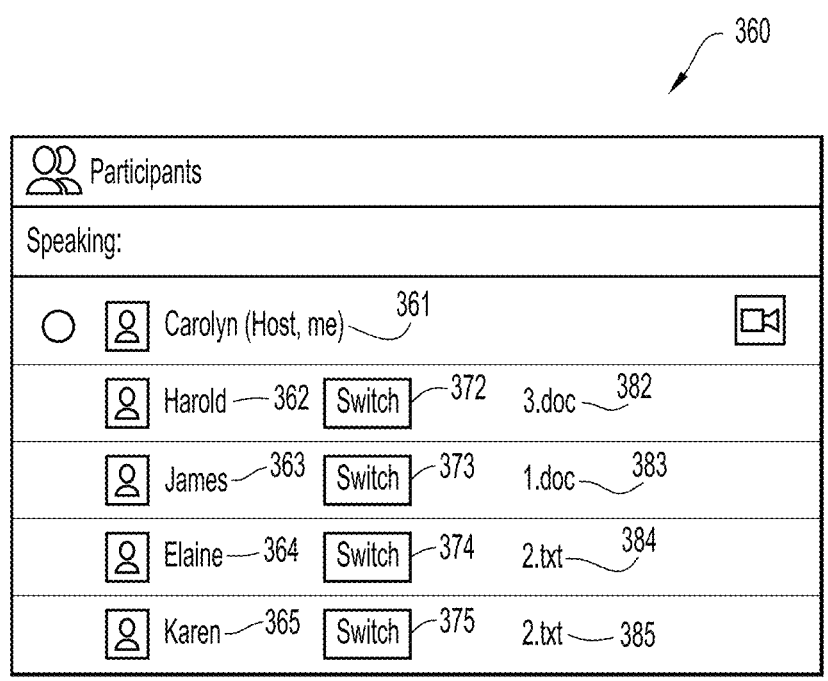
FIG. 3B shows a user interface element displayed on the presenter device that shows which window each attendee has brought to the foreground in his or her respective attendee device display.

Referring now to FIG. 3B, another example of a user interface element on the presenter device to control the z-order of the windows displayed on attendee devices is shown. In this example, user interface element 360 is displayed on the presenter device and shows all of the participants in the desktop sharing session, including the presenter 361 (e.g., Carolyn) and the attendees 362, 363, 364, and 365 (e.g., Harold, James, Elaine, and Karen). Each attendee 362-365 is associated with an element (e.g., a button) to switch the z-order displayed on the attendee device to match the z-order displayed on the presenter device. Buttons, 372, 373, 374, and 375 may be configured to switch the display of attendee devices 362, 363, 364, and 365, respectively. Additionally, in this example, user interface element 360 includes a display of which window each attendee device is displaying in the foreground. The name of window displayed in the foreground by attendee devices 362, 363, 364, and 365 are shown at 382, 383, 384, and 385, respectively. In the depicted example, Harold's device is displaying the window titled "3.doc," James's device is displaying the window titled "1.doc," and Elaine's and Karen's devices are both displaying the window titled "2.txt" in the foreground. User interface element 360 may show all of the participants in the desktop sharing session, or it may only show the attendee devices that are viewing the windows in a different z-order. For the example in which element 360 is displaying all of the participants in the desktop sharing session, a button to switch the attendee's display may be omitted if a particular attendee device is displaying the windows in the same z-order as the presenter device.

Figure 3C:
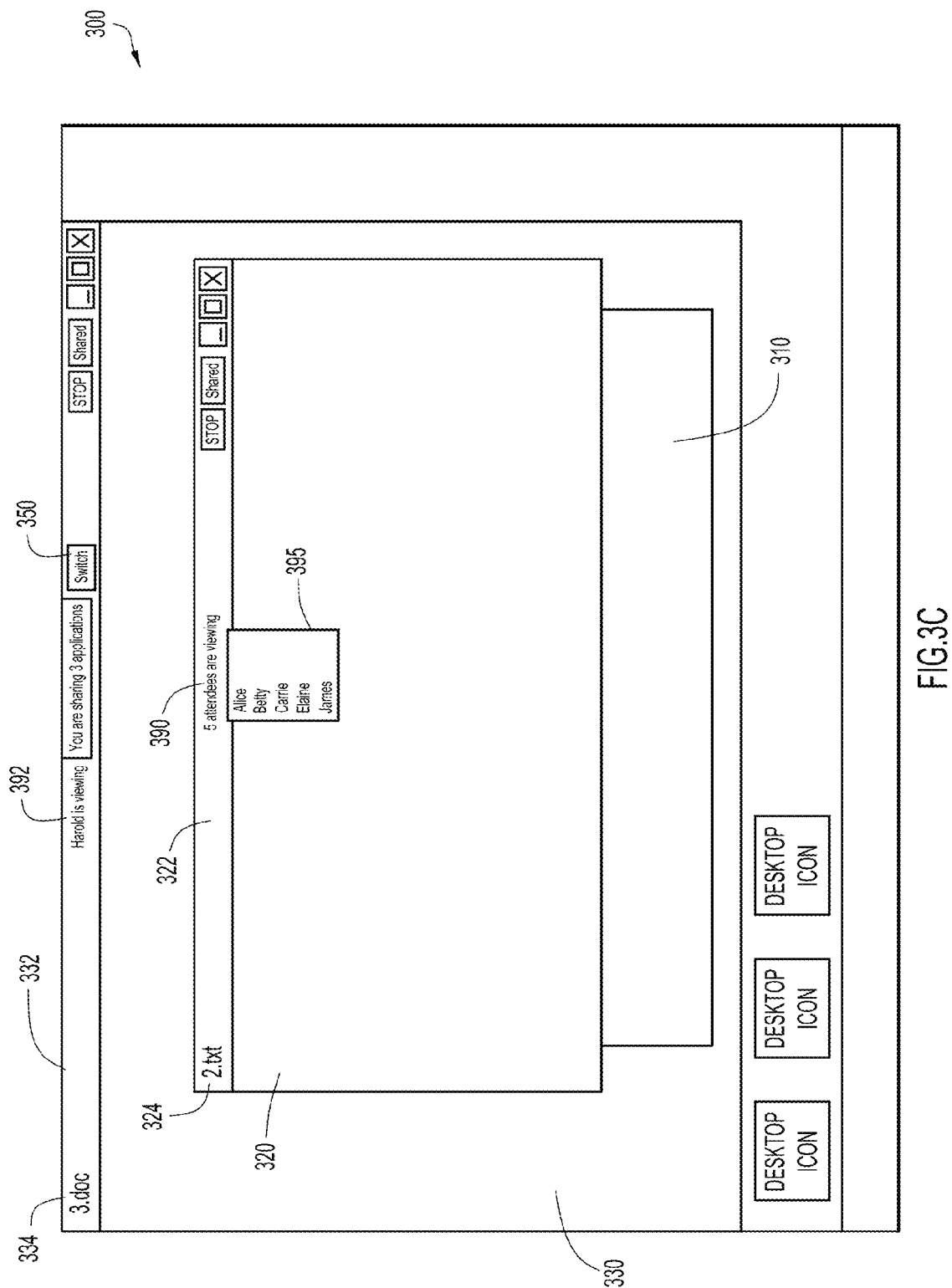
FIG. 3C shows a user interface element displayed on the presenter device that shows which attendee is viewing each window.

Referring now to FIG. 3C, a simulated screenshot shows another example of a user interface element that displays which attendee devices are displaying each window in the foreground. In this example, windows 320 and 330 are displayed with additional elements 390 and 392 in their respective title bars 322 and 332. Element 390 shows how many attendee devices are displaying window 320 in the foreground, and may be expanded to display a list 395 of the attendee devices (e.g., Alice, Betty, Carrie, Elaine, and James) that are displaying window 320 in the foreground. In this example, element 392 shows that only a single attendee device is displaying window 330 in the foreground and displays the name of the attendee device (e.g., Harold) directly in the title bar 332.

Figure 4A:
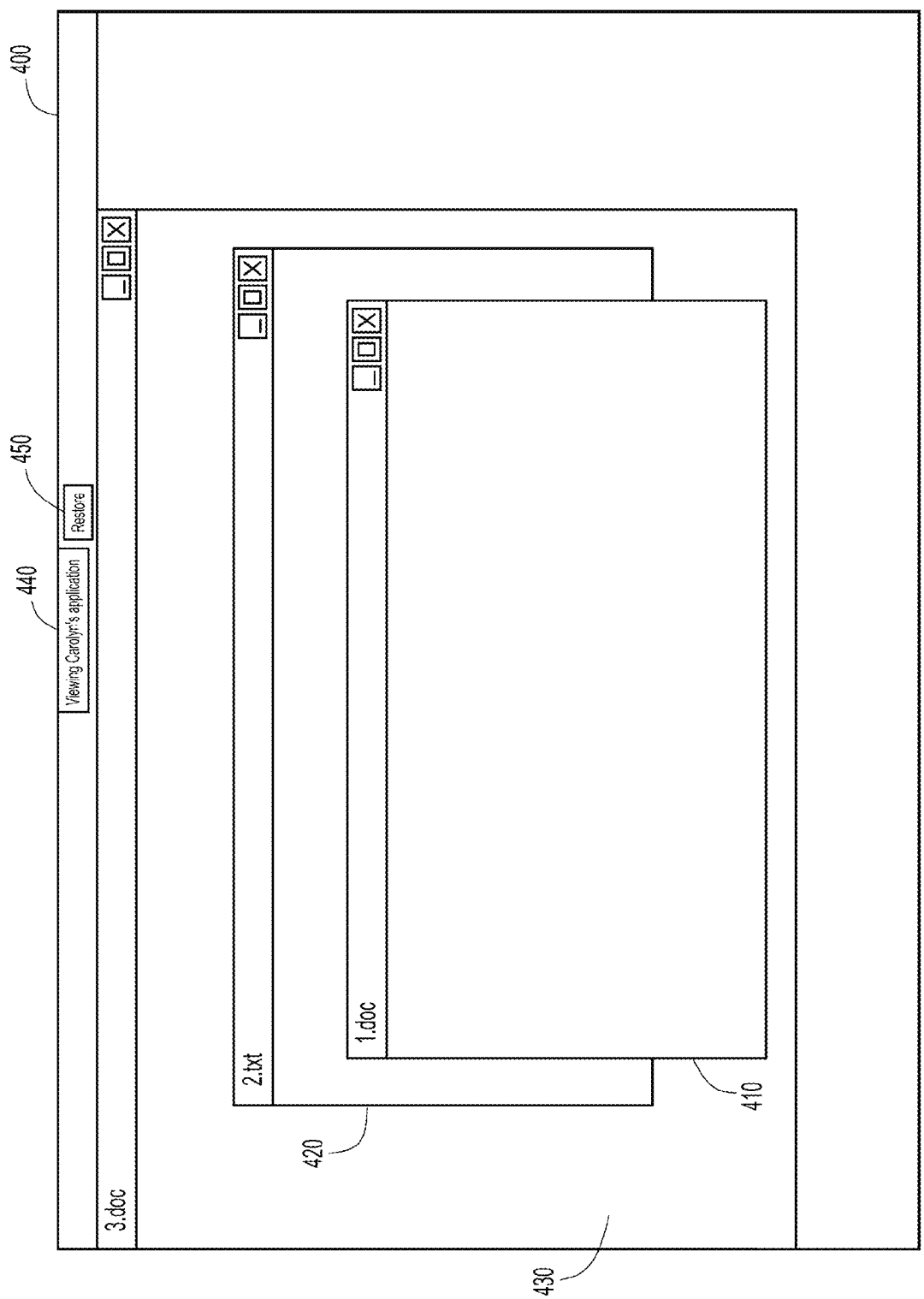
FIG. 4A is a simulated screenshot from the display of an attendee device in the desktop sharing session that matches the screen of the presenter device.

Referring now to FIG. 4A, a simulated screenshot shows the display of an attendee device with the windows from a shared desktop. An attendee device displays image data provided by the presenter device, possibly through the meeting server, that reproduces desktop image 400 on the attendee device's display. In this example, desktop 400 includes windows 410, 420, and 430 initially in the same z-order as the presenter device. Desktop 400 also includes an indication 440 of which desktop (e.g., Carolyn's desktop) the attendee device is currently displaying, as well as a user interface element (e.g., button) 450 to restore the z-order of the windows to match the presenter device. In the initial screenshot shown in FIG. 4A, window 410 is displayed in the foreground, with background windows 420 and 430 partially obscured.

Figure 4B:
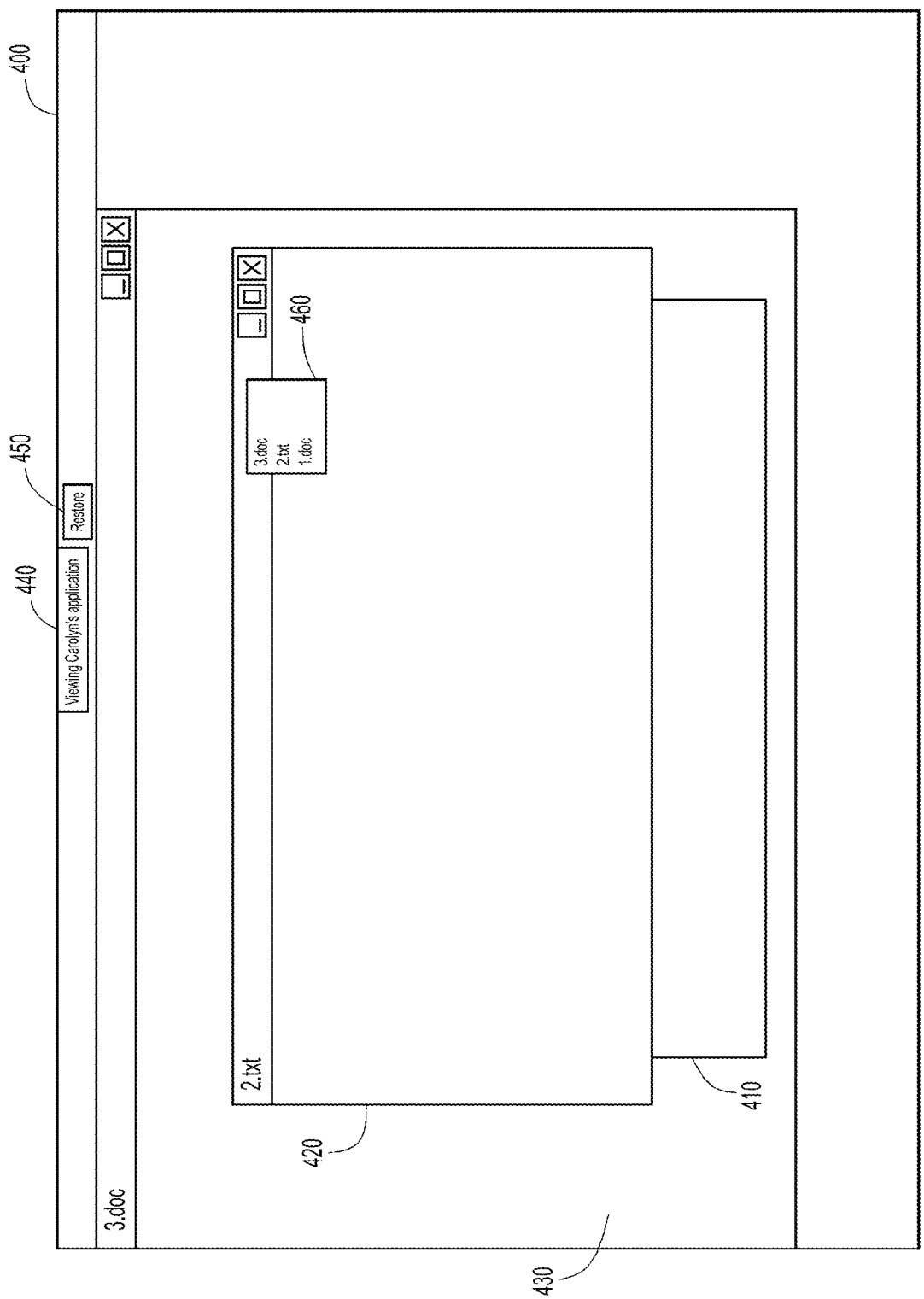
FIG. 4B is a simulated screenshot from the display of the attendee device after the attendee has brought one of the background windows to the foreground.

Referring now to FIG. 4B, a simulated screenshot shows the display of an attendee device with the windows from a shared desktop with a different window displayed in the foreground. In this example, the attendee has indicated (e.g., by clicking on the title bar) that the attendee device should display window 420 in the foreground. Window 420 is brought to the front, partially obscuring windows 410 and 430. User interface element 460 displays a list of all of the windows shared in the desktop sharing session, and allows the attendee to select any window to bring to the foreground. For example, in bringing window 420 to the front, the title bar of window 410 is completely obscured, and element 460 allows the attendee to bring window 410 back to the front without having to move window 420 in order to reveal the title bar of window 410.

Referring now to FIG. 5A, a simulated screenshot shows the display of an attendee device before and after the attendee has selected a background window to bring to the front. In this example, an attendee device displays desktop 400 with windows 410, 420, and 430. Initially, window 410 is in the foreground with windows 420 and 430 in the background partially obscured by window 410. The attendee then triggers window 420 to come to the foreground without changing the position of any of the windows. The attendee device then displays window 420 in front of windows 410 and 430, while the presenter device does not change the display of the shared windows in its display. In some examples, the presenter device may add or modify a user interface element to indicate that the attendee has brought window 420 to the foreground, as described with respect to FIGS. 3A-3C.

Referring now to FIG. 5B, a simulated screenshot shows the display of an attendee device before and after the attendee has moved the position of the foreground window, uncovering some of the background window that was previously obscured. In this example, window 410 is in the foreground of desktop 400 and windows 420 and 430 are in the background. The attendee moves window 410, uncovering additional portions of the background windows 420 and 430. In order to enable the attendee device to display desktop 400 with the moved window 410, either the presenter device or the meeting server supplies the attendee device with additional image data captured from the background windows on the presenter device. In one example, any windows moved on an attendee device are also moved on the display of the presenter device. This preserves some control of the presenter over what information on the presenter device is displayed on the attendee devices.

Referring now to FIG. 5C, a simulated screenshot shows the display of an attendee device before and after the attendee has brought a background window to the front and changed the size and position of the background window. Initially, in this example, window 410 is in the foreground and windows 420 and 430 are in the background. The attendee brings window 420 to the foreground on the attendee device, and moves and resizes the window 420. The additional image data required to display all of window 420 and any uncovered portions of window 430 are received from either the presenter device or the meeting server. The change in position and size of window 420 are displayed on the presenter device, but the change in z-order is not directly displayed on the presenter device.

Other user interface elements may be added to inform participants in the desktop sharing session that a particular attendee device has brought a different window to the foreground. In one example, a history bar updates every time an attendee device changes the foreground window. The update may include a message that indicates which window the attendee device has brought to the foreground, for example "Attendee A is viewing window Z now." In another example, a notification window may pop up on the bottom of the participants' desktop, and then disappear in a short time. In yet another example, the border of window may flash when any attendee brings that window to the foreground on their respective display.

Additionally, any or all of the user interface elements on the attendee device may be allowed or denied by the presenter device. The permissions for each user interface element may be specific to each window in the shared desktop session. In other words, the presenter may disable notifications when an attendee device displays one window (e.g., enhanced drawings of presentation) in the foreground, while enabling notifications when an attendee device displays any other type of window. Further, the presenter may allow or deny permission for each window to be brought to the front at all. For instance, the presenter may block the attendee devices from bringing the presenter's email inbox window to the front and viewing potentially sensitive communications. However, the presenter may enable bringing to the foreground a specific email that is open in a separate window, which may be specifically relevant to the sharing session.

Figure 6A:
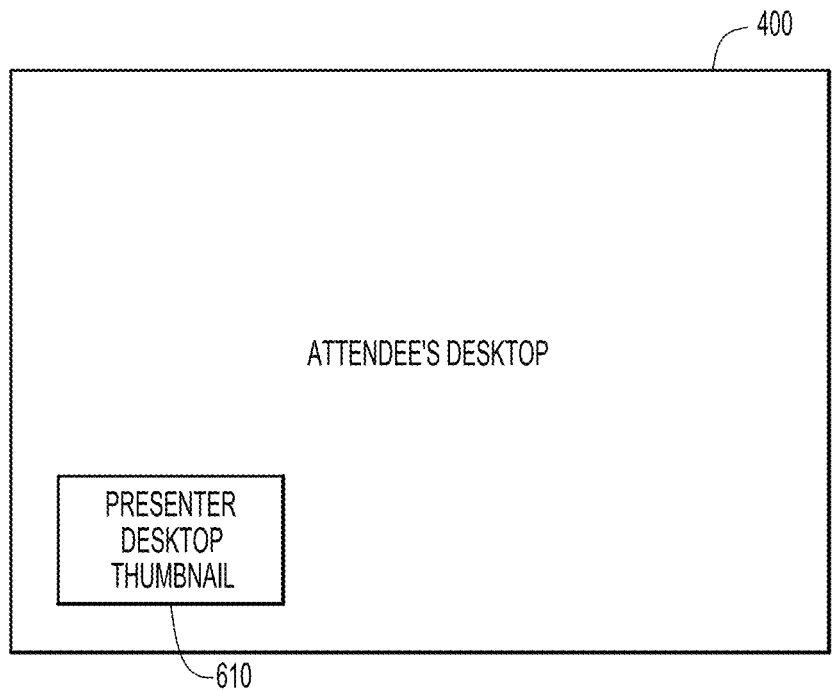
FIG. 6A shows a simulated screenshot from the display of the attendee device with a thumbnail image of the presenter device's display as a user interface element to restore the attendee device's display to the presenter device's display.

Referring now to FIG. 6A, a simulated screenshot shows an example of a user interface element added to an attendee device's display. In this example, a thumbnail 610 showing the presenter's view of the shared desktop is displayed on the attendee device's display. This thumbnail allows the attendee to see information as it is presented by the presenter, which helps maintain the context of the sharing session. However, the attendee is also free to adjust the view of the attendee device's display, so that the attendee can view other information that may be useful.

Figure 6B:
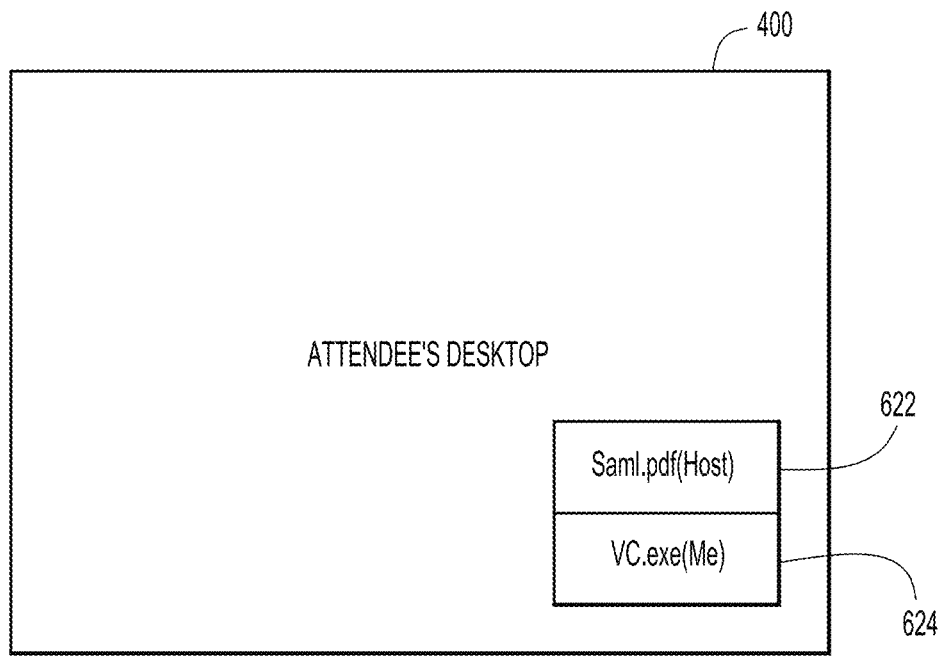
FIG. 6B shows a simulated screenshot from the display of the attendee device with a list of the windows in the desktop sharing session, enabling the attendee to choose which window to bring to the foreground.

Referring now to FIG. 6B, a simulated screenshot shows another example of a user interface element added to an attendee device's display. In this example, user interface element 620 is displayed on the attendee device's display of desktop 400. User interface element 620 includes a list of the windows that the participants of the sharing session have in the foreground of their respective displays. For the example shown in FIG. 6B, the list of user interface element 620 includes entry 622 that shows the attendee that the host has the window named "Saml.pdf" in the foreground and entry 624 that shows the attendee device has the window named "VC.exe" in the foreground. In another example, user interface element 620 may list all of the windows in the shared desktop, or only the windows that are in the foreground of one or more attendee devices. Additionally, user interface element 620 may allow for an attendee to click on a particular list entry, and bring the associated window to the front of the display. This would allow each attendee device to switch to another attendee's view and improve communication efficiency.

Referring now to FIG. 7A, a simulated screenshot shows an example of a user interface element added to the attendee devices' display to highlight the foreground window of the presenter device. In this example, the attendee device has brought window 420 to the front, and the presenter device's foreground window is displayed as window 410, behind window 420. To illustrate to the attendee which window the presenter device is currently displaying, border 710 is added to window 410. The attendee may then move and/or resize the windows so that none of window 410 is obscured by window 420, as shown in FIG. 7B.

Figure 8:
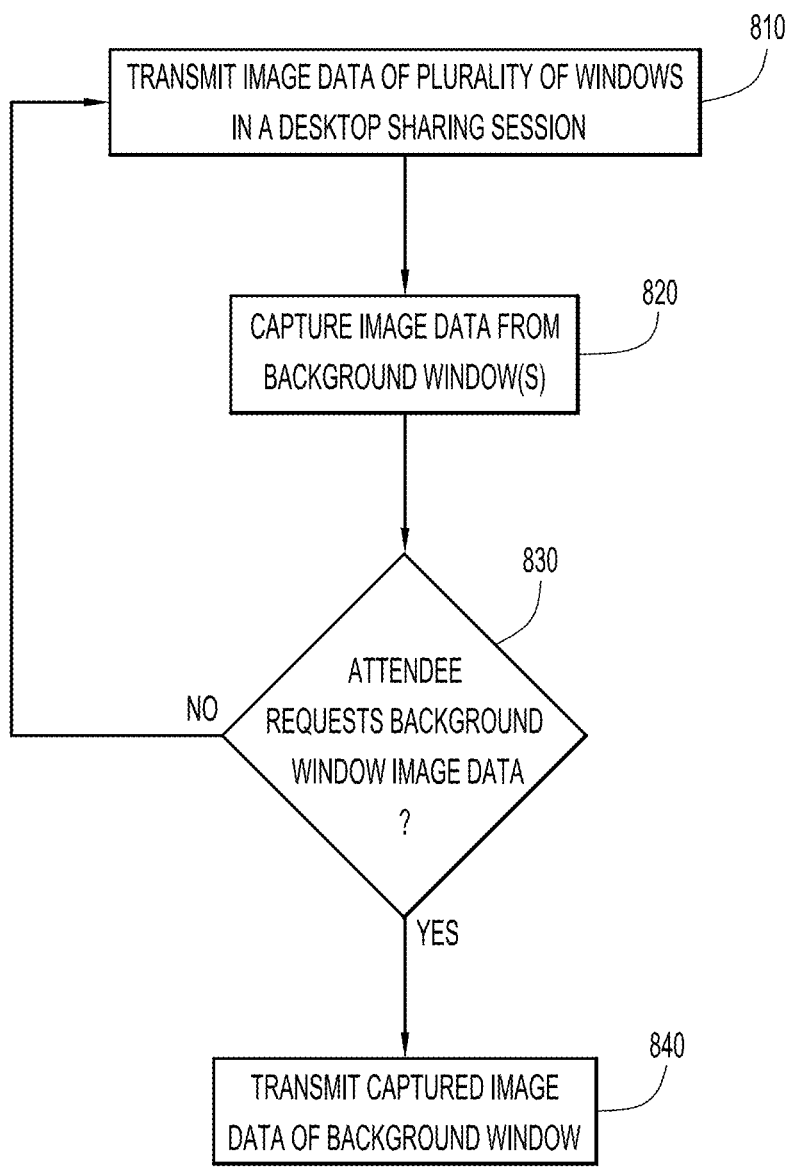
FIG. 8 is a flowchart of an example process performed by the presenter device to provide the image data of the background windows according to the techniques presented herein.

Referring now to FIG. 8, a flow diagram of an example process for a presenter device capturing and transmitting background window image data is shown. In step 810, the presenter device transmits image data of a plurality of windows in a desktop sharing session. The image data may be directly transmitted to the attendee devices, or it may be transmitted to a meeting server, which would forward the image data to the attendee devices. In step 820, the presenter device captures image data from the background windows, which may be obscured by the foreground windows. The image data of the background windows may be cached, either at the presenter device or at the meeting server. If an attendee device requests the background window image data (e.g., the attendee device is going to bring a background window to the front of the attendee device), as determined at step 830, then the presenter device transmits the captured image data of the background window at step 840. In another example, the presenter device captures the background window image data after the attendee has requested the background window image data to provide updated image data.

Figure 9:
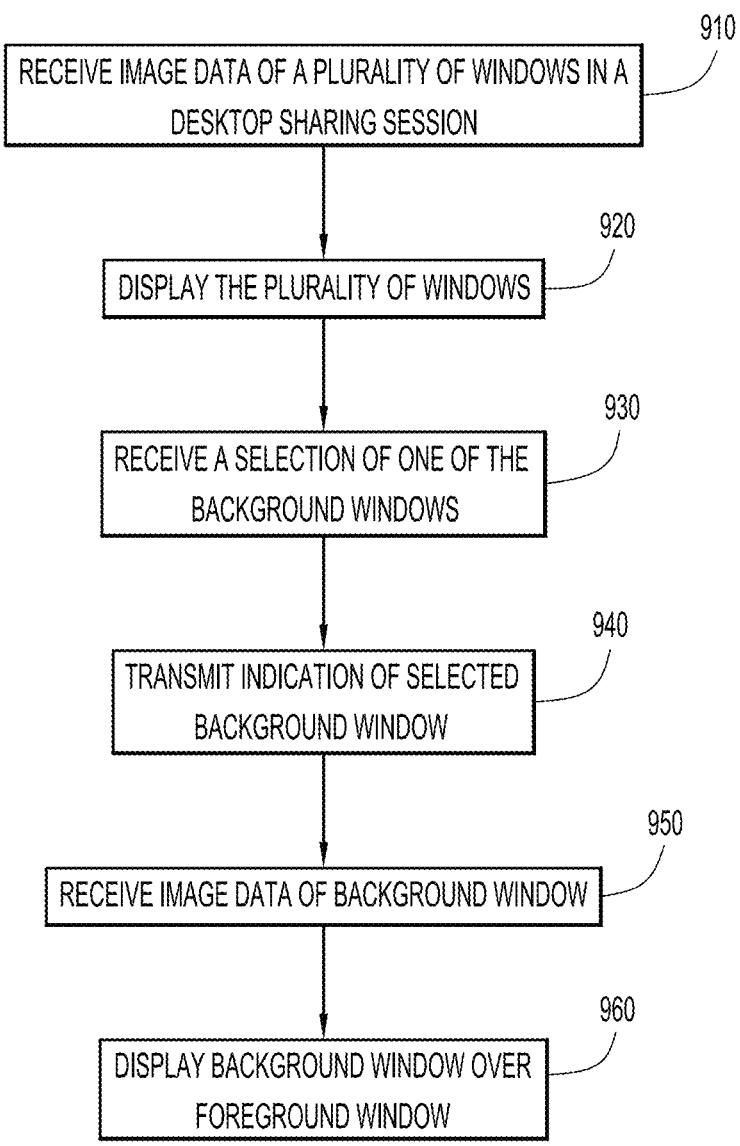
FIG. 9 is a flowchart of an example process performed by an attendee device to display the image data of the background windows according to the techniques presented herein.

Referring now to FIG. 9, a flow diagram of an example process for an attendee device bringing a background window to the front is shown. In step 910, the attendee device receives image data of a plurality of windows in a desktop sharing session. The attendee device displays the image data in step 920. In step 930, the attendee device receives a selection of one of the background windows to bring to the front of the display. In one example, the selection of the attendee may be received by the attendee device through a user interface (e.g., keyboard, mouse click, touch interface, etc.). In step 940, the attendee device transmits an indication of the selected background window, and receives the image data in return at step 950. In step 960, the attendee device uses the background window image data to display the selected window over the foreground window of the presenter device.

In summary, the above examples describe a system and method for allowing attendees in a desktop sharing session to view a different shared document than the presenter or the other attendees. This improves the efficiency of document sharing because an attendee does not have to interrupt the presenter to switch to an obscured document. Additionally, an attendee's status is visible to the presenter, allowing the presenter to switch to a different shared document that one or more attendees may be discussing. This improves collaboration and communication between desktop sharing participants.

In particular, the above examples describe a method comprising transmitting, to an attendee device participating in an online desktop sharing session, image data of a plurality of windows displayed on a presenter device participating in the online desktop sharing session. The plurality of windows comprises a foreground window obscuring at least a portion of at least one background window. The method further comprises capturing image data of at least one background window including the obscured portion of the background window without altering the display of the presenter device. A request is received from the attendee device for image data of at least one background window to display the background window over the foreground window on a display of the attendee device. In response to receiving the indication, the method comprises transmitting the captured image data of the background window, including any obscured portion, to the attendee device.

Further, the above examples describe an attendee device participating in an online desktop sharing session by receiving image data of a plurality of windows displayed on a presenter device. The plurality of windows includes a foreground window obscuring at least a portion of at least one background window. The attendee device displays the plurality of windows on its display. In response to a user input, the attendee device receives a selection of one of the background windows to display over the foreground window. The attendee device transmits an indication that the attendee device requires image data of the selected background window to display the selected background window over the foreground window. The attendee device receives image data of the selected background window including any portion that was obscured by the foreground window, and displays the image data of the selected background window over the foreground window on the display of the attendee device.

The above description is intended by way of example only. Various modifications and structural changes may be made therein without departing from the scope of the concepts described herein and within the scope and range of equivalents of the claims.

What is claimed is:

1. A method comprising:
   transmitting, to an attendee device participating in an online desktop sharing session, image data of a plurality of windows displayed on a presenter device participating in the online desktop sharing session, the plurality of windows comprising a foreground window obscuring at least a portion of at least one background window;
   receiving a request from the attendee device for image data of the at least one background window to display the at least one background window over the foreground window on a display of the attendee device;
   in response to receiving the request, capturing image data of the at least one background window including the obscured portion of the at least one background window without altering a display of the presenter device; and
   transmitting the captured image data of the at least one background window including the obscured portion of the at least one background window displayed over the foreground window, to the attendee device.

2. The method of claim 1, further comprising:
   receiving an indication that the attendee device has changed a property of a selected window from the plurality of windows; and
   changing the selected window on the display of the presenter device.

3. The method of claim 2, wherein the changed property of the selected window comprises at least one of size or position of the selected window.

4. The method of claim 1, further comprising:
   receiving a command to restore the display of at least one attendee device participating in the online desktop sharing session to match the display of the presenter device; and
   transmitting, to the at least one attendee device, image data corresponding to the plurality of windows as they are displayed on the presenter device.

5. The method of claim 4, wherein the command is received from a user interface element displayed on the presenter device.

6. The method of claim 4, wherein the command is received from the attendee device.

7. The method of claim 1, wherein the request for image data to display the at least one background window over the foreground window comprises an indication of which of the at least one background windows the attendee device will display over the foreground window.

8. The method of claim 7, wherein a plurality of attendee devices are participating in the online desktop sharing session, and further comprising displaying a user interface element on the presenter device, the user interface element showing which of the plurality of attendee devices is displaying the at least one background window over the foreground window and which of the at least one background windows each of the plurality of attendee devices is displaying over the foreground window.

9. The method of claim 1, wherein the plurality of windows comprises a plurality of browser tabs.

10. A method comprising:
    receiving, at an attendee device participating in an online desktop sharing session, image data of a plurality of windows displayed on a presenter device, the plurality of windows including a foreground window obscuring at least a portion of at least one background window;
    displaying the plurality of windows on a display of the attendee device;
    receiving a selection of one of the at least one background windows to display over the foreground window;
    transmitting a request that causes the presenter device to capture image data of the selected background window displaying the selected background window over the foreground window without altering a display of the presenter device;
    receiving image data of the selected background window including any portion that was obscured by the foreground window; and
    displaying, on the display of the attendee device, the image data of the selected background window over the foreground window.

11. The method of claim 10, further comprising:
    changing a property of a particular window of the plurality of windows; and
    transmitting, to the presenter device, an indication of the changed property of the particular window.

12. The method of claim 11, wherein the changed property comprises at least one of size or position of the particular window.

13. The method of claim 10, further comprising displaying a user interface element on the display of the attendee device, the user interface element enabling a command to match the display of the plurality of windows on the attendee device to the display of the plurality of windows on the presenter device.

14. The method of claim 13, further comprising:
    transmitting the command;
    receiving image data corresponding to the plurality of windows as displayed on the presenter device; and
    displaying the plurality of windows on the attendee device to match the plurality of windows displayed on the presenter device.

15. The method of claim 13, wherein the user interface element comprises one of a button or a thumbnail image of the plurality of windows as displayed on the presenter device.

16. The method of claim 10, wherein the plurality of windows comprises a plurality of browser tabs.

17. An apparatus comprising:
    a network interface configured to transmit and receive data in an online desktop sharing session;
    a display configured to display a plurality of windows from the online desktop sharing session;
    a processor configured to:
        transmit, to an attendee device participating in the online desktop sharing session, image data of the plurality of windows, the plurality of windows comprising a foreground window obscuring at least a portion of at least one background window;
        receive a request from the attendee device for image data of the at least one background window to display the at least one background window over the foreground window on the attendee device; and in response to receiving the request, capture image data of the at least one background window including the obscured portion of the at least one background window without altering the plurality of windows on the display; and transmit the captured image data of the at least one background window including the obscured portion of the at least one background window displayed over the foreground window, to the attendee device.

18. The apparatus of claim 17, wherein the processor is further configured to:

receive an indication that the attendee device has changed a property of a selected window from the plurality of windows; and change the selected window on the display.

19. The apparatus of claim 18, wherein the changed property of the selected window comprises at least one of size or position of the selected window.

20. The apparatus of claim 17, wherein the processor is further configured to:

receive a command to restore the plurality of windows displayed on at least one attendee device participating in the online desktop sharing session to match the plurality of windows on the display; and transmit, to the at least one attendee device, image data corresponding to the plurality of windows as they are displayed on the display.

21. The apparatus of claim 20, wherein the command is received from a user interface element.

22. The apparatus of claim 20, wherein the command is received from the attendee device.

23. The apparatus of claim 17, wherein the request for image data to display the at least one background window over the foreground window comprises an indication of which of the at least one background windows the attendee device will display over the foreground window.

24. The apparatus of claim 23, wherein a plurality of attendee devices are participating in the online desktop sharing session, and wherein the display is further configured to display a user interface element showing which of the plurality of attendee devices is displaying the at least one background window over the foreground window and which of the at least one background windows each of the plurality of attendee devices is displaying over the foreground window.

25. The apparatus of claim 17, wherein the plurality of windows comprises a plurality of browser tabs.

* * * * *